July 19, 1960  C. NICOLLE  2,945,335
APPARATUS FOR HANDLING SUPPOSITORIES AND SIMILAR ARTICLES
Filed June 2, 1955  2 Sheets-Sheet 2

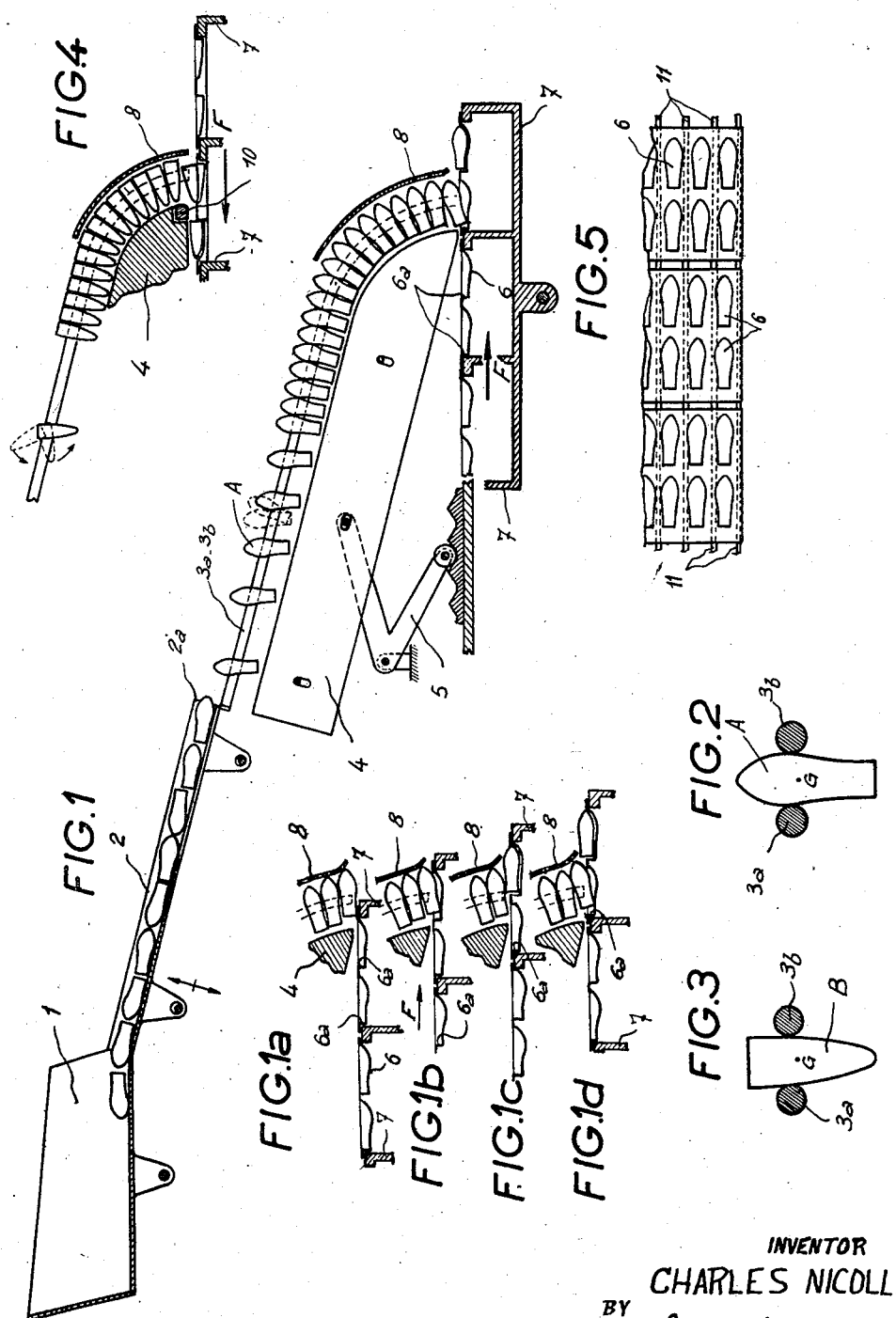

INVENTOR
CHARLES NICOLLE
BY
George H. Leorey
ATTORNEY

# United States Patent Office 2,945,335
Patented July 19, 1960

2,945,335
APPARATUS FOR HANDLING SUPPOSITORIES AND SIMILAR ARTICLES

Charles Nicolle, 54 Avenue Foch, Paris (16e), France

Filed June 2, 1955, Ser. No. 512,844

Claims priority, application France June 3, 1954

13 Claims. (Cl. 53—142)

It is customary in pharmaceutics to employ articles of oblong shape having a base end and a pointed tip, of which an important instance are suppositories. This invention relates to apparatus for handling and packing such articles in strips or bands formed with sockets and made of cellulose acetate or equivalent plastics employed for the packaging of such articles.

Heretofore the insertion of the articles into the recessed or socketted strips was performed by hand; the personnel employed on such job preferably wore rubber gloves.

A major difficulty encountered in rendering such packing operations automatic, was to provide for a proper orientation of the suppositories or similar articles with respect to the sockets which were to receive them, since it was of course necessary for the point of the suppository to fit the pointed end of the recess. The difficulty is considerably increased owing to the inherent nature of the articles.

Suppositories are generally provided in either of two different shapes; one is nearly completely conical ("shell"-shaped), while the other is nearly cylindrical, but formed with an enlargement near the point ("torpedo"-shaped).

The present invention has for its object the provision of apparatus whereby all of the suppositories in a batch, regardless of type, may first be arranged in an orderly array in a sense suitable for their ultimate packing, and then automatically inserted in the socketted packaging strips therefor.

One essential feature used for the purpose of arranging the suppositories in a common direction, lies in the provision of two parallel bars sloping at a slight angle, and spaced an amount less than the maximum diameter of the suppository, but greater than the diameter of the suppository at the cross section thereof which contains the centre of gravity.

As a result, regardless of the manner in which the suppository is deposited or introduced between the parallel bars its centre of gravity will necessarily become positioned beneath the diameter along which the suppository contacts the parallel bars. All the suppositories of a given type will therefore be positioned in a similar fashion.

Another feature of the invention resides in the fact that the feed or advance of the suppositories towards the loading station is effected in the following simple way: the parallel bars being inclined, the suppositories are intermittently lifted by their base ends, so that they have imparted to them a positive, though very low-amplitude, motion of step-by-step advance.

The invention is also characterized in that, at the loading station, the parallel bars terminate in a curved section whereby the suppositories are gradually brought into a horizontal position as required for loading. The curve is such that the suppositories will be disposed in a fan-like array and in contact engagement with one another, with the endmost suppository practically horizontal and the axes of the contiguous suppositories intersecting substantially at a common point on a level with the loading station.

Finally, the actual loading or insertion of the suppositories in the sockets may be effected simply and automatically by motion imparted to the socketted strip or band on the arrival of the suppositories.

It may be preferable however that the supporting bars be also provided movable, and in particular that they be made integral with the jigging channels, so that the above-mentioned movable member may thus be omitted and the equipment simplified accordingly.

According to a modification of the invention therefore, the said supporting bars or guide rails are integrally connected with the jigging channels or chutes and the whole assembly is subjected to periodic vibrations. The assembly comprising the jigging chutes and the bars is resiliently suspended from a stationary frame in such a way that the vertical displacements of the bars near the delivery station will not have a very high amplitude.

Finally, it has also been found that when suppositories are heaped in bulk, as in a feed hopper, the outlet of the hopper is apt to become clogged up. To avoid this, there is provided according to the invention a drum provided with flexible vanes disposed above the outlet of the hopper and adapted to fling back in an upward direction any suppositories which may be presented crosswise to the outlet.

In the above-mentioned modification, the vibratory or jigging assembly may be operated by a solenoid so arranged that the resultant of the vibrations will be directed in a direction to convey the suppositories along the jigging channels.

In the accompanying drawings, which illustrate by way of example only, two forms of embodiment of the invention:

Figure 1 is a greatly simplified sectional view of the general assembly of a plant constructed according to a first form of the invention for the handling of suppositories of the "torpedo" type;

Figures 1a, 1b, 1c and 1d illustrate in section various stages of the loading process in the plant of Fig. 1;

Figures 2 and 3 illustrate on a larger scale the manner in which the two chief types of suppositories are arranged to be supported on the parallel bars;

Figure 4 is similar to Fig. 1 but relates to another form of the invention applicable to the handling of "shell"-type suppositories;

Figure 5 illustrates in plan a system for guiding the socketted strips;

Figure 7:
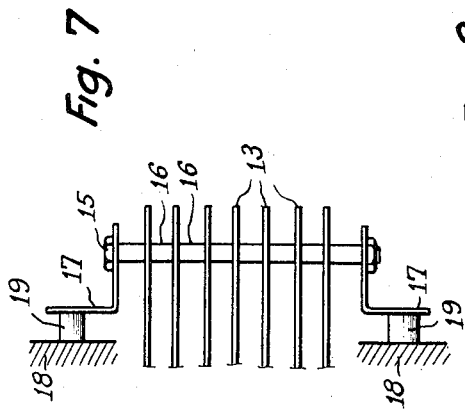
Figure 7 is a partial plan view of the guide rails in the third modification near the loading or delivery station.
Figure 8:
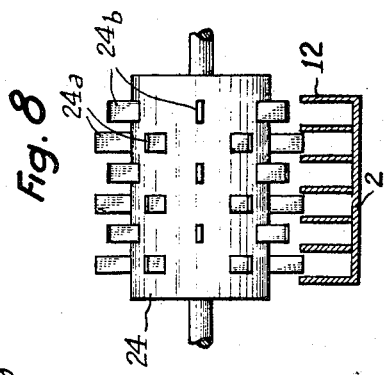
Figure 8 is a side elevational view of the drum serving to prevent clogging of the outlet.

The general bulk supply of the suppositories is from a container 1 having a fixed or free bottom end from which extends a channel or a set of parallel channels 2 in the form of gutters corresponding in diameter to that of the suppositories. These gutters or ducts serve to constrain the suppositories to line up end to end but do so without regard to the direction in which they are orientated. At the lower end 2a of the channel the suppositories drop in between a pair of parallel bars 3a and 3b between which the suppositories all have their pointed tip directed upwards in the case of the "torpedo"-type suppositories A now being considered. The manner in which compulsory orientation of the suppositories is caused to occur after they have dropped from the end 2a of the channel is quite simple and will be explained at a later point.

A movable member 4 is actuated by an angular lever 5 to assume a reciprocatory motion which in the illustrated example has both vertical and transverse components but might be made to possess a vertical component only. Such motion may be obtained by means of a continuous rack acting on the lever and which is made to follow the advance or feed of the packaging strips 6. The angle lever 5 may however be operated in any other appropriate way. As a result of this motion the suppositories are first lifted vertically and then are caused by gravity to tip over until the memer 4 has again moved down, whereupon all the suppositories previously lifted are restored to their position of balance on the bars, so that they are thereby caused to progress along said bars.

The parallel bars in their right-hand end section are curved in a downward arc terminating at the loading or delivery station. In this section the advance of the suppositories is aided by gravity, that is, the suppositories progressively move downwards as the column of suppositories underneath is cleared at its lower end at the delivery station. The object in providing this arcuate section is to bring the suppositories to the horizontal position required for the automatic loading step. Over the arcuate section the suppositories are positioned fanwise along the parallel bars, with their axes intersecting on a common centre located substantially on a level with the loading point. In this way the endmost suppository of the lot is practically horizontal (see Fig. 1).

Figure 1 relates to the case where a strip is used comprising two sockets spaced in the direction of feed. It will be obvious however that a similar strip might include several similar sets of sockets spaced across the width of the strip. In such cases a plurality of pairs of parallel bars would be arranged parallel with the first pair at a spacing corresponding to the transverse spacing between the center lines of the sets of sockets provided across the package strip.

Figures 2 and 3 illustrate the array of suppositories at the point at which they drop from the jig chutes 2.

The equilibrium position of a suppository of type A (torpedo type) between the parallel bars 3a and 3b is such that its centre of gravity is located below the plane of contact of the suppository with the parallel bars. The spacing of the parallel bars is suitably predetermined so that this contact plane lies between the centre of gravity and the cross section of maximum diameter. As a result, irrespective of the position assumed by the suppository as it drops in between the bars, its base will always assume a lowermost position either as the result of a simple sliding movement, or a tipping-over of the suppository.

Figures 1a, 1b, 1c and 1d illustrate the process by which the suppositories are loaded or inserted into the socketed strips. In Fig. 1a, the socketed strip is located to the rear of the suppositories. In its motion as indicated by arrow F, the strip advances under the column of suppositories. As the rear end of the socket 6a of the strip 6 engages the base of a suppository, the latter is carried forward in the displacement of the strip 6. A suitably shaped deflector 8 arranged above the arcuate part of bars 3a—3b causes the suppository to become lodged in its socket. The same is shown in Figs. 1c and 1d for the second suppository which is inserted into its socket in a similar fashion. After completion of this operation the loaded strip is removed.

The socketed strips are adapted to slide over two or more guide rails 11 (see Fig. 5). Any appropriate feed system which may be continuous or discontinuous in character may be provided for advancing the strips, for example a fork 7 adapted to engage the under surface of the tail ends of the sockets in the strip.

More simply the suppositories may be loaded onto continuous socketed strips advanced by a pulling action on one end of the strips, and the loaded strips may be cut up into sections subsequently.

In such event the strips are made to slide over rails 11 while a pusher or drag chain system imparts the advance motion in a succession of pulses or continuously.

Finally it is possible to operate in a discontinuous alternating manner. A first socketed strip would then be placed at the right end of a carriage which would be moved leftward, then rightward again. The strip would be loaded during this latter run, then removed. In this case it is necessary that during the leftward movement of the strip suppositories be prevented from falling as they do during the return run. For this purpose a retractable screen or equivalent blocking device may be provided which will assume a position under the suppositories to be loaded and prevent the latter from dropping into the sockets in the strip during the outward stroke. After the carriage has completed its outward stroke the retractable screen is removed to clear the way for loading and the system is ready to resume another operative cycle.

The means for controlling the retractable screen has not been illustrated and may comprise any suitable mechanical device connected with the fork 7.

In case the suppositories are of the B or "shell" type, it should be clear that the loading operation would not be effected in the same direction as above described since the sharp points would here be directed downwards.

Figure 4 shows an exemplary design for this case. The direction of loading is inverted but the deflector of Figure 1 is herein replaced by a deflector 10 which may or may not be removable, integrated in the lower right hand end of the movable support 4.

For greater rigidity the parallel bars may be replaced by flat vertical members provided with suitably rounded top edges.

Figure 6:
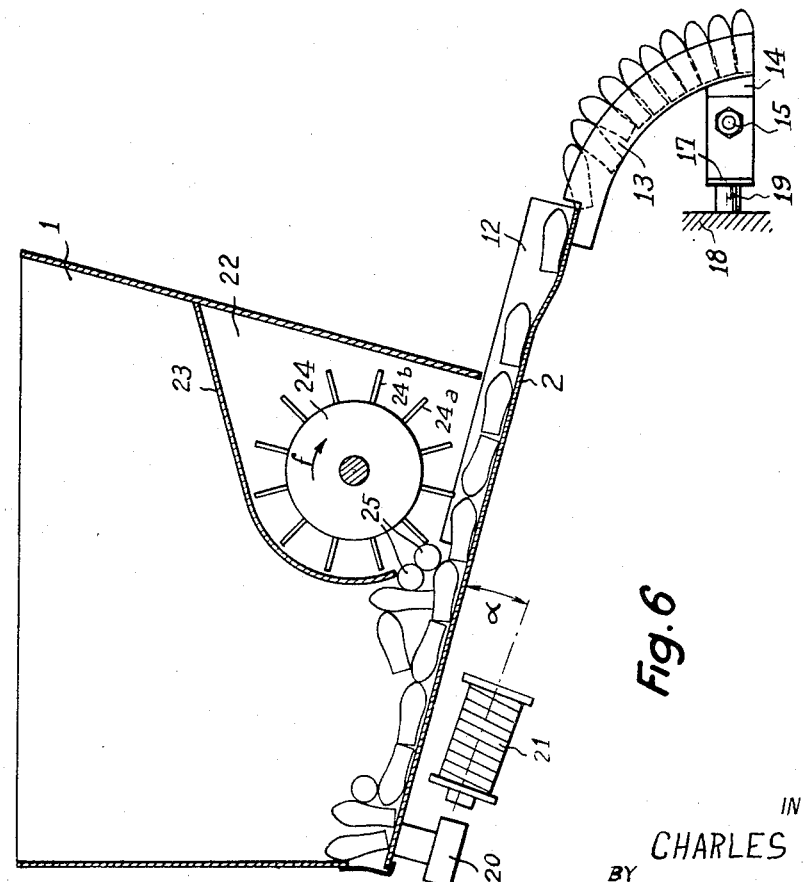
Figure 6 is a vertical sectional view of another modification of the suppository feeding apparatus.

Figure 6 includes the same main components as in the first two embodiments described. The fixed hopper 1 is arranged above a jigging conveyor 2 subdivided into channels directed along lines of steepest slope of the conveyor, each channel being separated from the next by a partition 12. At the lower end of each channel and extending from each partition wall 12 there are secured flat vertical sectors 13 which may for example be welded to the under side of jigging conveyor 2. Each sector 13 is shaped substantially to conform to the curvature of the rails 3a—3b of the previously disclosed embodiment and is moreover provided at its lower end with an extension 14 projecting within the sector. Through this extension the various sectors are interconnected by a bolt 15 and braced by bracing members 16. The bolt 15 at its end is provided with resilient ears 17 made of spring plate or the like and projecting at right angles from the bolt. These ears are likewise interbraced with bolt 15 and are moreover secured by one flange thereof to a fixed frame 18 through rubber blocks 19. The set of flat sectors 13 is located above the socketed strips previously described.

The upper end of jigging conveyor 2 is also resiliently suspended from hopper 1, and depending from it is an inverted anvil 20 adapted to be struck at periodic intervals by the core of a solenoid 21 positioned with its axis at an angle $\alpha$ such that the resultant of the strokes will be directed parallel to the path of the suppositories over the channels.

The assembly comprising the jigging channels, the various guide rails and sectors extending from them constitutes a unitary system suspended through resilient means and having periodical vibrations imparted to it, which at any time may be interrupted by the operator.

To prevent obstruction of the outlet of hopper 1, there is provided a chamber 22 above the outlet and separated from the main hopper chamber containing the bulk of the suppositories by a contoured partition 23.

Mounted within chamber 22 is a drum 24 provided with staggered vanes 24a and 24b adapted to have their tips positioned flush with the tops of the jigger channels. The drum is rotated as indicated by arrow f, i.e. in such a direction as to tend to sweep back any suppositories which might be lodged above the level of the partitions of the jigging channels. In this way, whenever a suppository is presented crosswise, as shown for instance for the suppositories 25, it is unable to penetrate into the channels and is struck by the flexible vanes of drum 24. The suppositories that are thus swept back will drop back again and will either drop properly into the channels or they will again approach crosswise in which case the vanes will again fling them away. The drum may be operated at any time, by the operator whenever he observes a break in the delivery of suppositories from the hopper outlet. The vanes on the drum are so arranged that along any one generatrix of the drum the clear space between the vanes at no point exceeds the length of a suppository.

It will be understood that the invention is not limited to the forms of embodiment described and illustrated by way of example.

What I claim is:

1. In an apparatus for feeding in a uniformly oriented array to a packaging station and assembling with packaging thereat a plurality of similar articles having the shape of bodies of revolution of vary diameter lengthwise thereof with their cross section of greatest diameter spaced lengthwise from their centers of gravity and closer to one end than to the other, a pair of parallel supports spaced apart a distance less than the maximum diameter of said articles but greater than the diameter thereof containing their centers of gravity, means for feeding each article successively on to said supports in general alignment therewith so that said articles become uniformly oriented by gravity with their heavier ends lowermost, means for advancing said articles along said supports to a delivery station, means for moving a socketed packaging member past said delivery station, and means for causing each article as it reaches said station to be inserted in a socket of said packaging member.

2. In an apparatus for feeding in a uniformly oriented array to a packaging station and assembling with packaging thereat a plurality of similar articles having the shapes of bodies of revolution of varying diameter lengthwise thereof with their cross section of greatest diameter spaced lengthwise from their centers of gravity and closer to one end than to the other, a pair of parallel supports spaced apart a distance less than the maximum diameter of said articles but greater than the diameter thereof containing their centers of gravity, means for feeding each article successively on to said supports in general alignment therewith so that said articles become uniformly oriented by gravity with their heavier ends lowermost, means for moving a socketed packaging member past said delivery station and means for causing each article as it reaches said station to be inserted in a socket of said packaging member, said parallel supports having an endmost section towards said delivery station which is curved in a downward arc whereby said articles are presented to said delivery station in a substantially horizontal position, means for advancing socketed packaging members past said delivery station in a direction crosswise of the path of the oriented articles being fed to such station, said packaging members having the socket portions thereof successively brought into registry with the descending row of oriented articles whereby the articles are successively received in said socket portions as the socketed members are fed past said delivery station, and means for advancing said socketed packaging members past said station.

3. Apparatus according to claim 2 which includes fixed deflector means associated with the arcuate section of said parallel supports for constraining each article to enter a socket as said article reaches the delivery station.

4. Apparatus according to claim 2 wherein the means for moving the socketed packaging members past the delivery station includes a carriage reciprocable between a plurality of positions relative to said delivery station.

5. Apparatus according to claim 2 wherein rails are positioned adjacent and beneath said delivery station for supporting and guiding said packaging members being moved past said delivery station.

6. Apparatus according to claim 2 wherein the means for moving the socketed packaging members past the delivery station includes a carriage reciprocable between two positions relative to said delivery station and means is provided for preventing the insertion of an article during the return of the carriage toward its initial article-receiving position.

7. In an apparatus for arranging into a uniformly oriented array a plurality of suppositories or similar articles having the shape of bodies of revolution of varying diameter lengthwise thereof with their cross sections of greatest diameter spaced lengthwise from their centers of gravity and closer to one end than to the other, a pair of parallel supports spaced apart a distance less than the maximum diameter of said articles but greater than the diameter thereof containing their centers of gravity, means for feeding each article successively on to said supports in general parallel alignment therewith so that said articles become uniformly oriented by gravity with their heavier ends lowermost, and means for advancing said articles along said supports to a delivery station, said supports including a terminal section reaching said delivery station which is curved in a downward arc, said arc having its center of curvature located below said parallel supports and being so shaped that said articles are spaced fanwise therein with their axes all intersecting at a common center substantially on a level with said delivery station, whereby said articles are presented to said delivery station in a substantially horizontal position.

8. In an apparatus of the class described, the combination of a hopper for receiving in a disordered array a plurality of suppositories or similar articles having the shape of bodies of revolution of varying diameter lengthwise thereof with a cross section of greatest diameter spaced lengthwise from their centers of gravity and closer to one end than to the other, a rotor mounted in said hopper adjacent the bottom outlet, said rotor having projecting vanes adapted to sweep an area of said hopper near said outlet clear of any articles tending to obstruct said outlet, a conveying duct associated with said hopper adjacent the bottom thereof for lining up and conveying said articles in end to end relation along said duct to its discharge outlet, a pair of parallel spaced supports connected to and leading from said discharge outlet, said supports being disposed below said discharge outlet and generally parallel to said duct whereby the articles as they are successively discharge from the duct move by gravity toward the supports, said supports being spaced apart a distance less than the maximum diameter of said articles but greater than the diameter thereof containing their centers of gravity, whereby the articles deposited on said supports are caused to orient themselves by gravity towards a substantially upright position with their heavier ends lowermost, and means for bodily vibrating said supports and said duct to advance said articles along said duct toward said supports and along the supports toward said delivery station.

9. Apparatus according to claim 8 wherein the assembly comprising the conveying duct and the parallel supports is resiliently suspended from a stationary frame and vibrating means is arranged to impart vibrations to said assembly in a direction generally corresponding to the direction of motion of said articles along said conveying duct.

10. In an apparatus for arranging into a uniformly oriented array a plurality of suppositories or similar articles having the shape of bodies of revolution of varying diameter lengthwise thereof with their cross sections of greatest diameter spaced lengthwise from their centers of gravity and closer to one end than to the other, a pair of parallel inclined supports spaced apart a distance less than the maximum diameter of said articles but greater than the diameter thereof containing their centers of gravity, means for feeding each article successively on to said supports in general parallel alignment therewith so that said articles become uniformly oriented by gravity with their heavier ends lowermost, a member positioned below and extending lengthwise of said supports and movable for engaging the lowermost ends of said articles to lift the latter slightly from their supported position, and means for imparting intermittent movement to said member.

11. In an apparatus of the class described, the combination of a hopper for receiving in a disordered array a plurality of suppositories or similar articles having the shape of bodies of revolution of varying diameter lengthwise thereof with a cross section of greatest diameter spaced lengthwise from their centers of gravity and closer to one end than to the other, a rotor mounted in said hopper adjacent the bottom outlet, said rotor having projecting vanes adapted to sweep an area of said hopper near said outlet clear of any articles tending to obstruct said outlet, a conveying duct associated with said hopper adjacent the bottom thereof for lining up and conveying said articles in end to end relation along said duct to its discharge outlet, a pair of parallel spaced supports leading from said discharge outlet, said supports being disposed below said discharge outlet and generally parallel to said duct whereby the articles as they are successively discharged from the duct move by gravity toward the supports, said supports being spaced apart a distance less than the maximum diameter of said articles but greater than the diameter thereof containing their centers of gravity, whereby the articles deposited on said supports are caused to orient themselves by gravity towards a substantially upright position with their heavier ends lowermost, and means for advancing said articles along said supports toward said delivery station.

12. Apparatus according to claim 11 wherein said vanes are disposed in staggered relation around said rotor and are spaced from one another lengthwise thereof a distance less than the length of each article.

13. Apparatus according to claim 12 wherein said vanes are formed of yieldable material.

References Cited in the file of this patent

UNITED STATES PATENTS

| | | |
|---|---|---|
| 1,047,984 | Phifer | Dec. 24, 1912 |
| 1,061,492 | Peterson | May 13, 1913 |
| 1,108,097 | Peterson | Aug. 18, 1914 |
| 1,325,752 | Pope | Dec. 23, 1919 |
| 2,356,108 | Walstedt et al. | Aug. 15, 1944 |
| 2,439,883 | Brown | Apr. 20, 1948 |
| 2,760,318 | Brenneck | Aug. 28, 1956 |